July 5, 1949.　　　L. R. PHILLIPS　　　2,474,955
HEATING APPARATUS
Filed Aug. 6, 1947
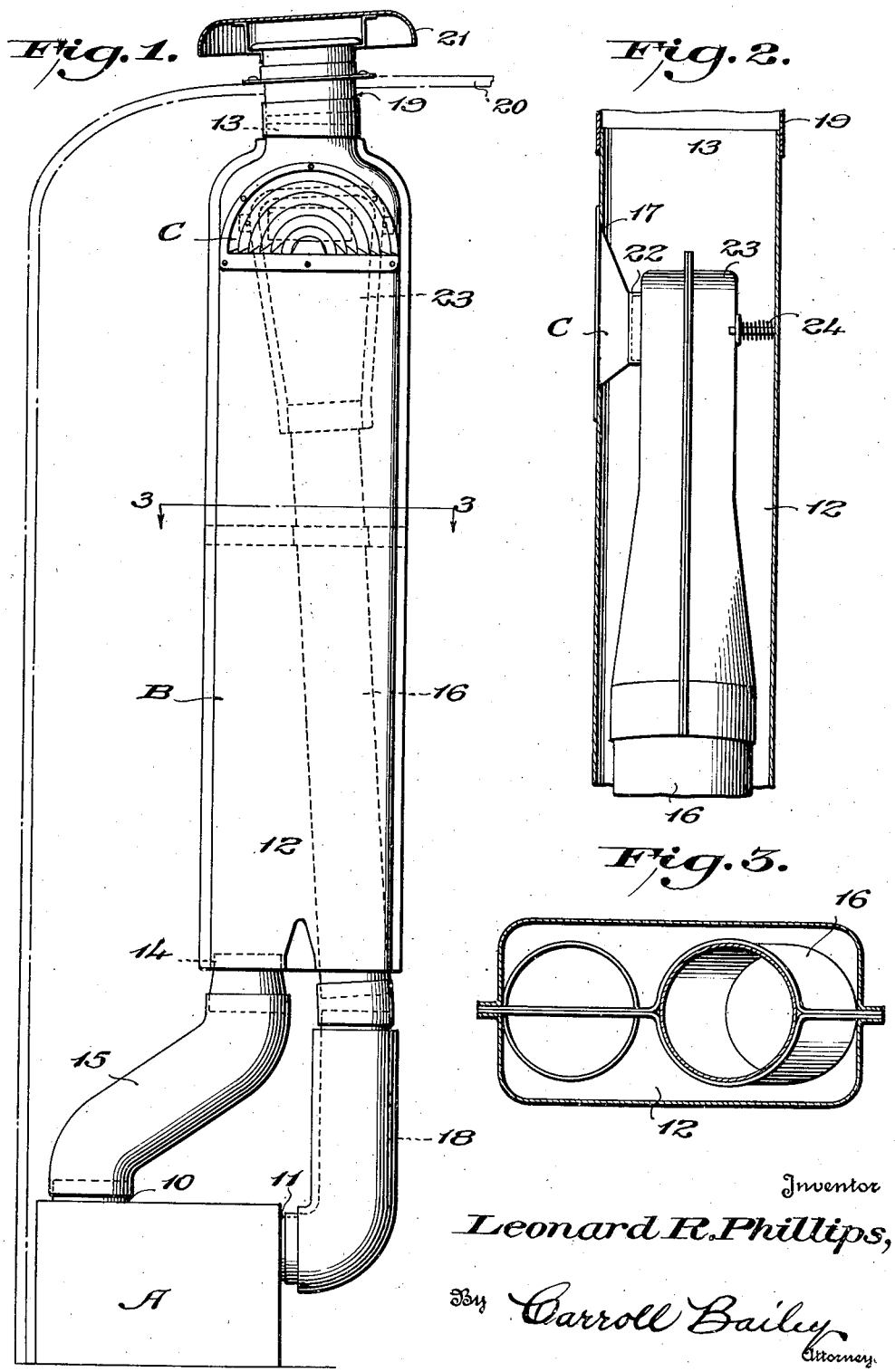

Patented July 5, 1949

2,474,955

UNITED STATES PATENT OFFICE 2,474,955

HEATING APPARATUS

Leonard R. Phillips, Teaneck, N. J., assignor to Anemostat Corporation of America, New York, N. Y., a corporation of Delaware Application August 6, 1947, Serial No. 766,815

2 Claims. (Cl. 237—48)

This invention relates to heating apparatus, particularly for heating the bodies of trucks and other vehicles, although not limited to that use, and has for its general object to provide a simple, practical heating apparatus which may readily be installed in an enclosure, such as a truck body, to be heated, and which is highly efficient in the performance of its purpose.

More particularly, a special and important object of the invention is to provide a heating apparatus comprising an air heating unit and a heat-exchange unit through which outside or other air to be heated is supplied to the heating unit and also through which heated air is delivered from the heating unit to the truck body or other enclosure to be heated, whereby the outside or other air to be heated is pre-heated by the delivered heated air and the latter has its temperature lowered by the incoming air. Thus, the heating unit may be of a type which heats air rapidly to a considerably higher temperature than is necessary or desirable in the truck body or other enclosure to be heated, whereby heating of the latter to a desired temperature may be effected rapidly and the desired temperature therein may readily be maintained despite very low outside temperatures.

Another special and important object of the invention is to provide a heating apparatus which is compact and occupies comparatively little valuable space in a truck body or other enclosure, thus adapting it specially for use in instances where space is limited and is a controlling factor in the installation of a heating apparatus.

With the foregoing and other objects in view, which will become more fully apparent as the invention is better understood, the same consists in a heating apparatus embodying the novel features of construction, combination and arrangement of parts as will be hereinafter more fully described, illustrated in the accompanying drawings and defined in the appended claims.

In the accompanying drawings, wherein like characters of reference denote corresponding parts in the different views:

Fig. 1 is a front elevation of a heating apparatus constructed in accordance with the invention.

Fig. 2 is a central vertical section through the upper portion of the heat-exchange unit of the apparatus; and Fig. 3 is a cross section on the line 3—3 of Fig. 1.

Referring to the drawings in detail, it will be observed that the present heating apparatus comprises primarily an air heating unit, designated generally as A, and a heat-exchange unit, designated generally as B.

The air heating unit A may be of any suitable or desired type such as one which derives its heat from the burning of gasoline or other fuel or from the hot cooling water or the exhaust gases of an engine of a truck or other vehicle with which the heating apparatus is associated. In any event, it preferably is of a type which is effective to heat air quite rapidly to a considerably higher temperature than is required in a truck body or other enclosure to be heated, and includes an inlet 10 for air to be heated and an outlet 11 for air heated thereby.

The heat exchange unit B may be of any suitable construction and comprises a preferably narrow, elongated chamber 12 having, at or near one end thereof, an inlet 13 for air to be heated and, at or near the other end thereof, an outlet 14 for air ot be heated connected in any suitable manner, as by means of a duct 15, to the inlet 10 of the heating unit A.

The heat exchange unit B further comprises a duct 16 for heated air disposed within the chamber 12 and extending therethrough from a point at or near its second mentioned end to a point at or near its first mentioned end where it is arranged to discharge through an opening 17 in a wall of said chamber.

At its end nearer the second mentioned end of the chamber 12 the duct 16 is suitably connected, as by means of a duct 18, to the outlet 11 of the heating unit A. Thus, it will be apparent that, during operation of the apparatus, air to be heated will flow through the chamber 12 to the heating unit A in heat-exchange relationship to heated air flowing from said heating unit through the duct 16, with the result that the air to be heated will be pre-heated prior to entering said heating unit and the heated air will have its temperature lowered. Consequently, the heating unit A may be effective to heat the air to a considerable higher temperature than is necessary or desirable in the enclosure, such as a truck body, into which the duct 16 discharges, so that heating of the enclosure to a desired temperature may be effected rapidly and may be maintained despite a very low temperature of the outside air.

While the heating unit A and the heat-exchange unit B may be disposed as desired in any particular installation of the apparatus, it is preferred, in the case of installation of the apparatus in a truck body, to have the heating unit A located upon or near the floor of the truck body and to have the heat-exchange unit B disposed vertically and located near the front end of the truck body where it occupies very little valuable space due to its compact, long, narrow form.

The inlet 13 of the heat-exchange unit B may open into the truck body or other enclosure with which the apparatus is associated so that the air in the enclosure will be recirculated through the apparatus, and in that event any suitable means may be provided for supplying fresh air to the enclosure. On the other hand, any suitable provision may be made for supply of outside air to the inlet 13 to insure a constant supply of fresh, heated air to the enclosure. In this latter connection and as illustrated in the drawings, a duct 19 may lead from the inlet 13 through an opening in, for example, the roof 20 of the truck body or the like, indicated by dot and dash lines, so that fresh, outside air is supplied to the heat-exchange unit and the heating unit. To prevent rain, snow and the like from entering the duct 19, the open upper end thereof may be covered by a suitable hood 21.

While it is not essential that heated air delivered from the duct 16 be diffused, its diffusion in most cases is desirable. Accordingly, the discharge end portion of the duct 16 may be constituted, if desired, by a suitable air diffuser designated generally as C. This diffuser may appropriately be of the type illustrated, for example, in F. J. Kurth Patent No. 2,300,049 dated October 27, 1942. If such a diffuser, or a diffuser of any other desired type is used, it may be suitably mounted within the chamber 12 to discharge through the opening 17 of the latter and may be connected in any suitable manner with the duct 16 as, for example, by a slip connection 22 between its inner or inlet end and a head 23 constituting the adjacent or upper end portion of the duct 16. If a slip connection is provided at 22, suitable spring means, designated as 24, may be provided to urge the head 23 toward the diffuser and thus maintain the connection. This provides for quick and easy assembly and disassembly of the apparatus for any desired purpose.

Besides the advantages anent heat exchange derived from disposing the duct 16 within the chamber 12, there is the added advantage that insulation of said duct is not required as would be the case if the same were disposed exteriorly of said chamber. Moreover, raising of the temperature of the incoming air during its flow through the chamber 12 practically eliminates condensation on said chamber and the other parts of the apparatus which might cause damage to the truck or the like or to the contents of a truck or the like in which the apparatus is installed.

While the chamber 12 may be of any suitable construction, it may appropriately be composed of two half sections welded or otherwise suitably connected together, and may contain any suitable mounting and bracing means for the duct 16.

From the foregoing description considered in connection with the accompanying drawings it is believed that the construction and operation of the present heating apparatus will be readily understood and its advantages appreciated. It is desired to point out, however, that while only a single, specific structural embodiment of the invention has been illustrated and described, the same is readily capable of specifically different structural embodiments within its spirit and scope as defined in the appended claims.

I claim:

1. A heating apparatus comprising an air heating unit to be disposed within an enclosure to be heated and having an inlet for air to be heated and an outlet for heated air, a heat-exchange unit also to be disposed within the enclosure and comprising a long, narrow vertically disposed chamber having an inlet at the top thereof for air to be heated and an outlet at the bottom thereof for air to be heated connected to the inlet of said heating unit, means for supplying air to said chamber through the said top inlet thereof from outside the enclosure, and a vertically disposed duct for heated air connected at its lower end to the outlet of said heating unit and extending through said chamber substantially from the bottom to the top thereof and having its upper end arranged to discharge heated air into the enclosure laterally through a top portion of said chamber at a point below the air inlet at the top of said chamber.

2. A heating apparatus comprising an air heating unit having an inlet for air to be heated and an outlet for heated air, a heat-exchange unit comprising a long, narrow vertically disposed chamber having an inlet at the top thereof for air to be heated and an outlet at the bottom for aid to be heated connected to the inlet of said heating unit, an air diffuser mounted in a side wall of said chamber near the upper end of the latter at a point below the air inlet at the top of said chamber for effecting diffused discharge of heated air into an enclosure, a vertically disposed duct connected at one end to the outlet of said air heating unit and extending through said chamber from the bottom thereof to said air diffuser and having a laterally engageable and disengageable slip connection at its upper end with said air diffuser, and yieldable means between the upper end portion of said duct and the side wall of said chamber opposite to the side wall of the latter in which said air diffuser is mounted to urge the upper end of said duct toward said air diffuser and thus releasably maintain engagement of said slip connection.

LEONARD R. PHILLIPS.

REFERENCES CITED

The following references are of record in the file of this patent:

UNITED STATES PATENTS

| Number | Name | Date |
|---|---|---|
| 1,099,876 | Hall | June 9, 1914 |
| 1,329,802 | Scherer | Feb. 3, 1920 |
| 2,337,105 | Ische | Dec. 13, 1943 |